US007384449B2

(12) United States Patent
Hattori et al.

(10) Patent No.: US 7,384,449 B2
(45) Date of Patent: *Jun. 10, 2008

(54) FERROMAGNETIC NANOPARTICLES, MATERIAL COATED WITH DISPERSION OF FERROMAGNETIC NANOPARTICLES, AND MAGNETIC RECORDING MEDIUM USING THE MATERIAL

(75) Inventors: Yasushi Hattori, Kanagawa (JP); Kouichi Masaki, Kanagawa (JP); Koukichi Waki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/410,025

(22) Filed: Apr. 25, 2006

(65) Prior Publication Data

US 2006/0194039 A1    Aug. 31, 2006

Related U.S. Application Data

(62) Division of application No. 10/234,841, filed on Sep. 5, 2002, now abandoned.

(30) Foreign Application Priority Data

Sep. 5, 2001    (JP)    ............................. 2001-269256

(51) Int. Cl.
B22F 9/24    (2006.01)
(52) U.S. Cl. .......................................... 75/345; 75/348
(58) Field of Classification Search ................. 75/345, 75/348
See application file for complete search history.

(56) References Cited

U.S. PATENT DOCUMENTS

| 3,622,409 | A | 11/1971 | MuCunn |
| 4,093,453 | A | 6/1978 | Makino et al. |
| 4,406,694 | A | 9/1983 | Mishima et al. |
| 5,252,367 | A | 10/1993 | Sato et al. |
| 5,325,351 | A | 6/1994 | Uchiyama et al. |
| 5,456,986 | A | 10/1995 | Majetich et al. |
| 5,735,969 | A | 4/1998 | Lown et al. |
| 5,982,567 | A | 11/1999 | Richter et al. |
| 5,989,728 | A | 11/1999 | Coffey et al. |
| 6,007,623 | A | 12/1999 | Thiele et al. |
| 6,044,792 | A | 4/2000 | Ogawa et al. |
| 6,068,800 | A * | 5/2000 | Singh et al. ................ 264/8 |
| 6,086,974 | A | 7/2000 | Thiele et al. |
| 6,162,532 | A | 12/2000 | Black et al. |
| 6,171,410 | B1 | 1/2001 | Kojima et al. |
| 6,262,129 | B1 | 7/2001 | Murray et al. |
| 6,302,940 | B2 | 10/2001 | Murray et al. |
| 6,331,364 | B1 | 12/2001 | Baglin et al. |
| 6,368,658 | B1 | 4/2002 | Schwarz et al. |
| 6,372,302 | B1 | 4/2002 | Kurose et al. |
| 6,875,253 | B2 | 4/2005 | Daimon et al. |
| 6,878,445 | B2 * | 4/2005 | Hattori et al. ............. 428/402 |
| 6,962,685 | B2 * | 11/2005 | Sun ........................... 423/632 |
| 6,994,895 | B2 | 2/2006 | Hattori et al. |
| 7,022,156 | B2 * | 4/2006 | Hattori et al. ................ 75/351 |
| 7,066,978 | B2 * | 6/2006 | Waki et al. ................... 75/348 |
| 7,067,199 | B2 | 6/2006 | Hattori et al. |
| 7,108,927 | B2 | 9/2006 | Hattori et al. |
| 2002/0041980 | A1 | 4/2002 | Suzuki et al. |
| 2002/0068187 | A1 | 6/2002 | O'Connor et al. |
| 2002/0086185 | A1 | 7/2002 | Yasui et al. |
| 2002/0098381 | A1 | 7/2002 | Coffey et al. |
| 2002/0142163 | A1 | 10/2002 | Mino et al. |
| 2003/0059604 | A1 | 3/2003 | Hattori et al. |
| 2004/0005458 | A1 | 1/2004 | Hattori et al. |
| 2004/0071923 | A1 | 4/2004 | Fullerton et al. |
| 2004/0137276 | A1 | 7/2004 | Hattori et al. |
| 2004/0229086 | A1 | 11/2004 | Takahashi et al. |
| 2004/0231907 | A1 | 11/2004 | Ishii |
| 2005/0155214 | A1 | 7/2005 | Hattori et al. |
| 2005/0217760 | A1 | 10/2005 | Hattori et al. |
| 2006/0029741 | A1 | 2/2006 | Hattori et al. |
| 2006/0194039 | A1 | 8/2006 | Hattori et al. |

FOREIGN PATENT DOCUMENTS

| DE | 2555826 | | 6/1976 |
| DE | 2461201 A1 | | 11/1978 |
| EP | 1 376 625 A2 | | 1/2004 |

(Continued)

OTHER PUBLICATIONS

Sun, S., Murray, C., Weller, D., Folks, L., and Moser, A., "Monodisperse FePt Nanoparticles and Ferromagnetic FePt Nanocrystal Superlattices", Science, 287, 2000, pp. 1989-1992.

(Continued)

Primary Examiner—George Wyszomierski
(74) Attorney, Agent, or Firm—Sughrue Mion, PLLC

(57) ABSTRACT

Ferromagnetic nanoparticles which are produced by reducing, in the presence of a polymer, two or more metals having different reduction potentials twice or more, using two or more reducing agents having different reduction potentials, a material coated with a dispersion of ferromagnetic nanoparticles in which the ferromagnetic nanoparticles are dispersed, and a magnetic recording medium which has a magnetic layer consisting of the material. The ferromagnetic nanoparticles having a holding power Hc of 95.5 kA/m or more, the material coated with the dispersion of ferromagnetic nanoparticles having excellent industrial coatability, and the magnetic recording medium using the dispersion are provided.

15 Claims, No Drawings

FOREIGN PATENT DOCUMENTS

| | | |
|---|---|---|
| JP | 53-110920 | 9/1978 |
| JP | 56-033810 | 4/1981 |
| JP | 56-153532 | 11/1981 |
| JP | 62-257705 | 11/1987 |
| JP | 03-169001 | 7/1991 |
| JP | 2001-101645 | 4/2001 |
| JP | 2001-256631 | 9/2001 |
| JP | 2002-157727 | 5/2002 |
| JP | 2003-073705 | 3/2003 |
| JP | 2003-113401 | 4/2003 |
| JP | 48-058398 | 12/2007 |

OTHER PUBLICATIONS

"Thermal Effect Limits in Ultrahigh-Density Magnetic Recording", Weller, D. and Moser, A., IEEE Trans. Mag., 35(6), Nov. 1999, 4423-4439.

Web page titled "Tengam Engineering, Inc., :::Magnetic Glossary", http://www.tengam.com/html/magnetic.html, pp. 1-5.

Web page titled "Chapter 12 Properties of Magnetic Materials", http://astrowww.phys.uvic.ca/~tatum/elmag/em12.pdf, pp. 1-8.

Kumbhar et al. "Magnetic Properties of Cobalt and Cobalt-Platinum Alloy Nanoparticles Sythesized Via Microemulsion Technique" IEEE Transactions on Magnetics., vol. 37, No. 4, Jul. 201, pp. 2216-2218.

* cited by examiner

FERROMAGNETIC NANOPARTICLES, MATERIAL COATED WITH DISPERSION OF FERROMAGNETIC NANOPARTICLES, AND MAGNETIC RECORDING MEDIUM USING THE MATERIAL

This is a divisional of application Ser. No. 10/234,841 filed Sep. 5, 2002 now abandoned; the disclosure of which is incorporated herein by reference.

BACKGROUND OF THE INVENTION

1. Field of the Invention

The present invention relates to ferromagnetic nonoparticles which are inexpensive and can be used in an MRAM and a magnetic recording medium, a material coated with a dispersion containing the ferromagnetic nanoparticles, and a magnetic recording medium having a magnetic layer consisting of the material coated with the dispersion containing the ferromagnetic nanoparticles.

2. Description of the Related Art

Magnetic recording media widely used as recording tapes, video tapes, computer tapes, disks, and the like are denser and have shorter recording wavelengths every year. Increasing the S/N ratio in such magnetic recording media is important. The smaller the particle size of ferromagnetic particles, the lower the noise when the total weight of the particles is the same. However, when the particle size of iron particles, which are generally used as ferromagnetic particles, decreases, a phenomenon (superparamagnetism) where magnetization cannot be maintained is caused due to heat fluctuation. Accordingly, there are limits to reducing noise using the conventional iron particles.

In order to overcome this problem, use of ferromagnetic nanoparticles having a particle size of 50 nm or less has been proposed. As for a unitary system, ferromagnetic nanoparticles of Co, Fe, and Ni are described in *J. Appl. Phys.*, Vol. 80, No. 1, pp. 103-108, 1996, and ferromagnetic nanoparticles of Co are described in *J. Appl. Phys.*, Vol. 79, No. 8, Part 2A, pp. 5312-5314, 1996. However, the ferromagnetic nanoparticles have a holding power Hc of only 47.76 kA/m (600 Oe), and there ferromagnetic nanoparticles having a holding power Hc of 95.5 kA/m (1200 Oe), which is required for the magnetic recording media, have not been obtained.

Japanese Patent Application Laid-Open (JP-A) No. 2000-54012 discloses a method for forming ferromagnetic nanoparticles, comprising the steps of: forming a solution of a metal precursor from a transition metal; adding a coagulant to the solution so that nanoparticles are separated from the metal precursor solution without forming permanent agglomeration; and adding a solution of hydrocarbon to the metal precursor solution so that the nanoparticles are recombined or become colloids again.

Further, U.S. Pat. No. 6,162,532 discloses particles containing a magnetic material selected from the group consisting of elements Co, Fe, Ni, Sm, Nd, Pr, Pt, and Gd, intermetallic compounds of the aforementioned elements, binary and ternary alloys of the elements, an Fe oxide further containing at least one of the elements other than Fe, barium ferrite, and strontium ferrite. U.S. Pat. No. 6,162,532 and *Science*, Vol. 287, 1989 (2000) disclose a method for forming particles by adding a solution of a metal precursor to a surfactant solution.

*Science*, Vol. 287, 1989 (2000) also discloses a production method of ferromagnetic FePt nanoparticles. A coated product of ferromagnetic nanoparticles is obtained by sedimenting nanoparticles, which are protected only by a surfactant, on the surface of a support in a stationary manner. However, the stationary sedimentation method takes time and is not preferable from an industrial point of view.

Studies in *Surface and Catalysis*, 132, 243 (2001) suggest synthesis of magnetic nanoparticles in a binder. However, ferromagnetic nanoparticles having a holding power Hc of 95.5 kA/m (1,200 Oe) or more, which are required for the magnetic recording media, cannot be obtained by mere synthesis of magnetic nanoparticles in a binder.

SUMMARY OF THE INVENTION

In view of the above-described conventional problems, the present invention is intended to achieve the following object.

Namely, the object of the present invention is to provide ferromagnetic nanoparticles having a holding power Hc of 95.5 kA/m or more, a material coated with a dispersion of the ferromagnetic nanoparticles excellent in industrial coatability, and a magnetic recording medium using the same.

The above object can be achieved by the following means. Namely, the present invention provides ferromagnetic nanoparticles which are produced by reducing, in the presence of a polymer, at least two types of metals having different reduction potentials at least twice, using at least two reducing agents having different reduction potentials.

An aspect of the present invention is ferromagnetic nanoparticles in which at least two of the metals are a noble metal and a poor metal, and the noble metal is reduced before the poor metal.

Another aspect of the present invention is ferromagnetic nanoparticles produced by reducing the noble metal with a reducing agent having a reduction potential higher than −0.2 V, and reducing the poor metal with a reducing agent having a reduction potential lower than −0.2 V.

Still another aspect of the present invention is ferromagnetic nanoparticles in which at least one of the metals is selected from the group consisting of Co, Fe, Ni, Mn, Cr, Pr, Pt, Au, Ag, Ir, and Rh.

Yet another aspect of the present invention is ferromagnetic nanoparticles which are ferromagnetic regular alloys having either CuAu or $Cu_3Au$ crystal structure.

Further, the present invention provides a material comprising a non-magnetic support that is coated with a dispersion of ferromagnetic nanoparticles containing at least the above ferromagnetic nanoparticles and a polymer.

The material is formed by coating the dispersion onto the support and then annealing the coated support at a temperature that exceeds a transformation temperature between regular phase and irregular phase.

Furthermore, the present invention provides a magnetic recording medium, which has a magnetic layer consisting of the above material.

DESCRIPTION OF THE PREFERRED EMBODIMENTS

Ferromagnetic nanoparticles, a material coated with a dispersion of ferromagnetic nanoparticles, and a magnetic recording medium of the present invention will be described below.

Ferromagnetic Nanoparticles

Ferromagnetic nanoparticles of the present invention are produced by reducing, in the presence of a polymer, two or more metals having different reduction potentials twice or more, using two or more reducing agents having different reduction potentials. The "ferromagnetic nanoparticles" described herein refer to nanoparticles having ferromagnetic characteristics or nanoparticles having an ability to gain ferromagnetic characteristics through processes such as annealing.

A liquid phase method, a gaseous phase method, and a mechanochemical synthesis method can be used to form the ferromagnetic nanoparticles. However, in the present invention, the ferromagnetic nanoparticles are preferably synthesized using the liquid phase method, which is advantageous for mass production. In the liquid phase method, an organic solvent, water, or a mixture of an organic solvent and water may be used as a solvent. Preferable examples of the solvent include water, alcohol, and polyalcohol. Methanol, ethanol, butanol, or the like can be used as the alcohol, and ethylene glycol or glycerine can be used as the polyalcohol.

In the present invention, a polymer is used as an adsorbent in the reduction and separation of the metals. The polymer serves as a binder when a coated product is obtained, whereby a nanoparticle-containing layer is formed regardless of stationary sedimentation of nanoparticles. Examples of the polymer, which can be preferably used in the present invention, include polyvinyl alcohol (PVA), poly N-vinyl-2 pyrrolidone (PVP), gelatin, sodium polyacrylate, polyacrylic acid amide, and the like. PVP is particularly preferable. The polymer has a weight average molecular weight of preferably 20,000 to 60,000, and more preferably 30,000 to 50,000. The polymer preferably weighs 0.1 to 10 times, and more preferably 0.1 to 5 times as much as the ferromagnetic nanoparticles.

At least one of the two or more metals is preferably selected from the group consisting of Co, Fe, Ni, Mn, Cr, Pr, Pt, Au, Ag, Ir, and Rh. Further, at least two of the two or more metals are preferably a noble metal and a poor metal.

In the present invention, the poor metal may be separated first, the noble metal may be separated first, or the poor metal and the noble metal may be separated at the same time. A reducing agent having a reduction potential lower than $-0.2$ V (vs. N. H. E) is preferably used to reduce the poor metal and the noble metal at the same time. When an alloy is reduced and separated in a liquid, it is preferable in the present invention that the noble metal is separated first, and then the poor metal is separated independently or together with the noble metal so that a particle size becomes uniform. In order to separate the poor metal, a reducing agent may be used, or a compound having zero poor metal value may be added. An example of the compound having zero poor metal value is iron carbonyl. In order to separate the noble metal and the poor metal in this order using reducing agents, it is preferable that a reducing agent having a reduction potential lower than $-0.2$ V (vs. N. H. E) is used after a reducing agent having a reduction potential higher than $-0.2$ V (vs. N. H. E) has been used.

The reduction potential depends on the pH level of the system. Preferable examples of the reducing agent having a reduction potential higher than $-0.2$ V (vs. N. H. E) include alcohols, $H_2$, and HCHO. Preferable examples of the reducing agent having a reduction potential lower than $-0.2$ V (vs. N. H. E) include $S_2O_6^{2-}$, $H_2PO_2^-$, $BH_4^-$, $N_2H_5^+$, $H_2PO_3^-$, and glycols (such as ethylene glycol).

Pt, Pd, Rh, or the like can be preferably used as the noble metal. $H_2PtCl_6 \cdot 6H_2O$, $Pt(CH_3COCHCOCH_3)_2$, $RhCl_3 \cdot 3H_2O$, $Pd(OCOCH_3)_2$, $PdCl_2$, $Pd(CH_3COCHCOCH_3)_2$, or the like can be dissolved in a solvent and used. The concentration of the resulting solution is preferably 0.1 to 1,000 µmol/ml, and more preferably 0.1 to 100 µmol/ml.

Co, Fe, Ni or Cr can be preferably used as the poor metal. Fe and Co are particularly preferable. Such metals can be used by dissolving $FeSO_4 \cdot 7H_2O$, $NiSO_4 \cdot 7H_2O$, $CoCl_2 \cdot 6H_2O$, $Co(OCOCH_3)_2 \cdot 4H_2O$, or the like in a solvent. The concentration of the resulting solution is preferably 0.1 to 1000 µmol/ml, and more preferably 0.1 to 100 µmol/ml.

In the present invention, a binary alloy is preferably a ferromagnetic regular alloy having either a CuAu or $Cu_3Au$ crystal structure. Examples of the alloy preferably used as a ferromagnetic regular alloy having a CuAu crystal structure include FeNi, FePd, FePt, CoPt, and the like. FePd, FePt, and CoPt are particularly preferable.

Examples of the alloy preferably used as a ferromagnetic regular alloy having a $Cu_3Au$ crystal structure include but are not limited to $Ni_3Fe$, $FePd_3$, $Fe_3Pt$, $FePt_3$, $CoPt_3$, $Ni_3Pt$, $CrPt_3$, and $Ni_3Mn$. $FePd_3$, $FePt_3$, $CoPt_3$, and $Fe_3Pt$ are particularly preferable.

A reduction reaction for separating the noble metal can be carried out at a temperature of 80 to 360° C., and more preferably 80 to 240° C., according to the required boiling points of the ferromagnetic nanoparticles and solvent. When the temperature is less than 80° C., the particles do not grow. When the temperature exceeds 360° C., the particles grow without being controlled, thereby increasing undesirable by-products.

The temperature at which a reduction reaction for separating the poor metal is carried out is not particularly limited and can be room temperature. However, the temperature at which reduction is carried out using a compound having zero poor metal value is the same as the temperature at which the noble metal is separated.

The reaction is preferably carried out in an inert gas in order to prevent oxidation of the ferromagnetic nanoparticles. Preferable examples of the inert gas include He, Ar, $N_2$, and the like.

When the ferromagnetic nanoparticles produced from a solution have an irregular phase, the ferromagnetic nanoparticles are preferably annealed in order to obtain a regular phase. The annealing temperature must exceed a transformation temperature between the regular phase and the irregular phase, which transformation temperature is determined using differential thermal analysis (DTA). The annealing time is preferably 1 minute to 24 hours, and more preferably 1 to 30 minutes.

In order to enhance the phase transformation of the ferromagnetic particles, it is effective to facilitate diffusion of atoms by oxidizing the ferromagnetic particles before annealing and introducing oxide deficiency by annealing the ferromagnetic particles under a non-oxidative atmosphere, and particularly under a reductive atmosphere.

Preferable examples of gases used for the non-oxidative atmosphere condition include $N_2$, Ar, He and Ne. Preferable examples of gases used for the reductive atmosphere condition include methane, ethane and $H_2$. In view of preventing explosions, mixtures of reductive atmospheric gases and non-oxidative atmospheric gases are preferably used. Specifically, a temperature for the phase transformation is 300 to 600° C., and preferably 300 to 500° C.

In order to enhance the phase transformation of the ferromagnetic particles, causing a stress-induced phase transformation by pressure annealing is also effective. Specifically, the pressure for the stress-induced phase transformation is preferably 2 to 10 atmospheres and more preferably 2 to 5 atmospheres, and a temperature for the stress-induced phase transformation is preferably 150 to 450° C. and more preferably 200 to 350° C. The time the annealing is maintained at a maximum temperature is preferably 1 to 60 minutes, and more preferably 1 to 30 minutes.

It is preferable to conduct the pressure annealing under a reductive atmosphere in view of using the effects of both together. However, filling reductive gases under high pressure and processing under high temperature requires safety precautions, and thus is not always industrially advantageous. Therefore, it is preferable to introduce oxide deficiency by annealing the ferromagnetic particles under a reductive atmosphere and then conduct pressure annealing under a non-oxidative atmosphere in view of obtaining the effects of both.

The holding power of the ferromagnetic nanoparticles is preferably 95.5 to 398 kA/m (1,200 to 5,000 Oe). When the ferromagnetic nanoparticles are applied to a magnetic recording medium, the holding power of the ferromagnetic nanoparticles is preferably 95.5 to 278.6 kA/m (1,200 to 3,500 Oe) in view of compatibility with a recording head. The particle size of the ferromagnetic nanoparticles is preferably 1 to 100 nm, more preferably 3 to 20 nm, and most preferably 3 to 10 nm. Various crystallization methods are effective for increasing the particle size. In order to use the ferromagnetic nanoparticles for a magnetic recording medium, closest possible packing of the ferromagnetic nanoparticles is preferable in view of increasing recording capacity. For this reason, the standard deviation in the size of the ferromagnetic nanoparticles is preferably less than 10%, and more preferably 5% or less.

When the particle size is too small, the ferromagnetic nanoparticles become superparamagnetic and thus undesirable. Therefore, various crystallization methods are preferably used to increase the particle size. A metal nobler than a metal forming the particles might be separated depending on the crystallization method. In such a case, the particles are preferably hydrotreated in advance to prevent oxidation of the particles.

Although outermost layers of the ferromagnetic nanoparticles are preferably formed of a noble metal in view of preventing oxidation, ferromagnetic nanoparticles having an outermost layer of a noble metal easily agglomerate. Therefore, in the present invention, the outermost layers of the ferromagnetic nanoparticles are formed of an alloy of a noble metal and a poor metal.

Removing salts from the solution after synthesis of the ferromagnetic nanoparticles is preferable in terms of improving dispersion stability of the particles. There are desalting methods in which an excessive amount of alcohol is added to the solution to form light aggregates, which are sedimented naturally or centrifugally, and salts are removed together with a supernatant liquid. However, aggregates are easily formed in these methods. Thus, ultrafiltration is preferably used in the present invention.

A transmission electron microscope (TEM) can be used to evaluate the particle size of the ferromagnetic nanoparticles according to the present invention. Although electron diffraction by the TEM can be used to determine a crystal system of the ferromagnetic nanoparticles, X-ray diffraction provides higher accuracy. The component analysis of an inside of the ferromagnetic nanoparticles is preferably evaluated using an FE-TEM with an EDAX attached thereto, which FE-TEM can narrow electron beams. A magnetic property of the ferromagnetic nanoparticles can be evaluated using a VSM.

The ferromagnetic nanoparticles of the present invention can be preferably used for video tapes, computer tapes, recordable floppy disks, and hard disks. Use of the ferromagnetic nanoparticles for MRAMs is also preferable.

Material Coated With a Dispersion of Ferromagnetic Nanoparticles

A dispersion of ferromagnetic nanoparticles of the present invention is formed by dispersing the above-described ferromagnetic nanoparticles and polymer. In one embodiment, material of the present invention comprises a non-magnetic support that is coated with the dispersion. In another embodiment, the material of the present invention is formed by coating the dispersion onto the support and then annealing the coated support a temperature that exceeds a transformation temperature between regular phase and irregular phase The dispersion has high coatability because the polymer serves as a binder, as described above. The polymer weighs, as described above, preferably 0.1 to 10 times, and more preferably 0.1 to 5 times as much as the ferromagnetic nanoparticles. In any embodiment of the present invention, the presence of the polymer works to prevent adherence of the ferromagnetic particles and to provide industrial coatability.

Magnetic Recording Medium

Hereinafter, description will be given of a method for manufacturing a magnetic recording medium and the material coated with the dispersion in which the ferromagnetic nanoparticles of the present invention can be preferably used, and a magnetic recording medium of the present invention will be described in detail via the manufacturing method thereof. The magnetic recording medium of the present invention includes a magnetic layer and, if necessary, other layers, and the magnetic layer consists of the material coated with the dispersion. Namely, the magnetic recording medium of the present invention includes, on the surface of the base (non-magnetic support), a magnetic layer containing ferromagnetic nanoparticles and, if necessary, a non-magnetic layer disposed between the magnetic layer and the base. If the magnetic recording medium is a disk, a magnetic layer and, if necessary, a non-magnetic layer can be provided on the rear surface of a support as well. If the magnetic recording medium is a tape, a backing layer is preferably provided on a surface of a support opposite from a surface thereof on which a magnetic layer is provided.

In the magnetic recording medium of the present invention, a non-magnetic layer comprising inorganic powder and a binder is provided between the base and the magnetic layer, if necessary. Examples of the inorganic powder used in the non-magnetic layer include metal oxides, metal carbonates, metal sulfates, metal nitrides, metal carbides, and metal sulfides. Among these, titanium oxide or α-iron oxide is particularly preferable in view of availability, cost, ease of control of particle size distribution, and the like. It is preferable that the α-iron oxide is needle-shaped or spindle-shaped, and has an average major axis length of 0.05 to 0.3 µm, a major axis length/a minor axis length ratio of 3 to 10, and a pH level of 8 to 11. It is preferable that the titanium oxide is spherical, and has a specific surface area of 50 to 80 $m^2/g$ and a pH level of 8 to 11. A particle size of the titanium oxide is preferably 0.01 to 0.1 µm.

Polyurethane resin; polyester-based resin, polyamide-based resin; vinyl chloride-based resin; acrylic-based resin in which styrene, acrylonitrile, methyl methacrylate, and the like are copolymerized; cellulose-based resin such as nitro-cellulose; epoxy resin; phenoxy resin; and polyvinyl alkylal resin, such as polyvinylacetal or polyvinylbutyral can be used, alone or in combination, as the binder for the non-magnetic layer. Polyurethane resin, vinyl chloride-based resin, and acrylic-based resin are preferable.

In order to improve dispersibility of the ferromagnetic nanoparticles and the non-magnetic particles, the binder preferably has a functional group (polar group), which adheres to the surfaces of the particles. Preferable examples of the functional group include —$SO_3M$, —$SO_4M$, —PO$(OM)_2$, —OPO$(OM)_2$, —COOM, >$NSO_3M$, >$NRSO_3M$, —$NR^1R^2$, and —$N^+R^1R^2R^3X^-$, wherein M is hydrogen or an alkali metal, such as Na or N; R is an alkylene group; $R^1$, $R^2$, and $R^3$ are alkyl groups, hydroxyalkyl groups, or hydrogen; and X is a halogen such as Cl or Br. An amount of the functional group in the binder is preferably 10 to 200 μeq/g, and more preferably 30 to 120 μeq/g. When the amount exceeds 200 μeq/g or is less than 10 μeq/g, dispersibility deteriorates. In addition to the adhering functional group, the binder preferably has a functional group having active hydrogen, such as a —OH group, such that the functional group reacts with an isocyanate hardening agent to form a crosslinking structure, thereby improving film strength. A preferable amount of the functional group is 0.1 to 2 meq/g. The binder has a weight average molecular weight of preferably 10,000 to 200,000, and more preferably 20,000 to 100,000. When the weight average molecular weight is less than 10,000, film strength becomes insufficient, and durability deteriorates. When the weight average molecular weight exceeds 200000, dispersibility deteriorates.

Polyurethane resin, which is a preferable binder, is described in detail in *Poriuretane Jushi Handbukku* ("Polyurethane Resin Handbook"), edited by Keiji Iwata, 1986, The Nikkan Kogyo Shimbun, Ltd. Polyurethane resin is generally obtained by addition polymerization of long-chain diol, short-chain diol (sometimes referred to as a "chain extending agent"), and a diisocyanate compound. Polyester diol, polyether diol, polyether ester diol, polycarbonate diol, or polyolefin diol having a molecular weight of 500 to 5,000 is used as the long-chain diol. The polyurethane resin is called polyester urethane, polyether urethane, polyether ester urethane, polycarbonate urethane, or the like, according to the type of the long-chain diol.

A glass-transition temperature of the polyurethane resin is preferably 0 to 200° C., and more preferably 40 to 160° C. When the temperature is less than 0° C., durability deteriorates. When the temperature exceeds 200° C., calender moldability deteriorates, whereby magnetic parametric performance deteriorates.

Examples of a method of introducing the adhering functional group (polar group) described above into the polyurethane resin include a method in which the functional group is used for a position of monomers of the long-chain diol, a method in which the functional group is used for a position of the short-chain diol, and a method in which the polar group is introduced by a polymer reaction after polymerization of polyurethane.

A copolymer of vinyl chloride monomers and various monomers is used as the vinyl chloride-based resin. Examples of the monomer for copolymerization include fatty acid vinyl esters, such as vinyl acetate and vinyl propionate; acrylates and methacrylates, such as methyl (metha)acrylate, ethyl(metha)acrylate, isopropyl(metha)acrylate, butyl(metha)acrylate, and benzyl(metha)acrylate; alkylallylethers, such as allylmethylether, allylethylether, allylpropylether, and allylbutylether; styrene; α-methylstyrene; vinylidene chloride; acrylonitrile; ethylene; butadiene; and acrylamide. Examples of the monomer for copolymerization having a functional group include vinyl alcohol, 2-hydroxyethyl(metha)acrylate, polyethylene glycol(metha) acrylate, 2-hydroxypropyl(metha)acrylate, 3-hydroxypropyl (metha)acrylate, polypropyrene glycol(metha)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl (metha)acrylate, allyl glycidyl ether, phosphoethyl(metha) acrylate, sulfoethyl(metha)acrylate, p-styrene sulfonic acid, and Na salts and K salts thereof. Herein, "(metha)acrylate" means a monomer containing at least one of acrylate and methacrylate.

A composition of vinyl chloride monomers in the vinyl chloride-based resin is preferably 60 to 95% by mass. When the amount is less than 60% by mass, dynamic strength decreases. When the amount exceeds 95% by mass, solubility of the monomers in a solvent deteriorates, the viscosity of the solution becomes high, and dispersibility deteriorates. Preferable amounts of the adhering functional group (polar group) and the functional group for increasing hardening ability with a polyisocyanate-based hardening agent are as described above. These functional groups may be introduced by copolymerizing monomers containing the aforementioned functional groups or by conducting a polymer reaction after copolymerization of the vinyl chloride-based resin. A preferable polymerization degree is 200 to 600, and more preferably 240 to 450. When the polymerization degree is less than 200, dynamic strength deteriorates. When the polymerization degree exceeds 600, the viscosity of the solution becomes high, and dispersibility deteriorates.

An amount of the binder in the non-magnetic layer is preferably 5 to 25% by mass with respect to the non-magnetic particles. Carbon black is preferably included in the non-magnetic layer for various purposes, such as for decreasing surface electrical resistance Rs of the magnetic recording medium, decreasing light transmittance of the magnetic recording medium in a direction perpendicular to a magnetic surface thereof, and setting a micro Vickers hardness of the non-magnetic layer to within a desirable range (preferably 30 to 50 kg/mm$^2$). Carbon black is preferably included in an amount of 1 to 50% by mass with respect to the non-magnetic particles.

Further, the non-magnetic layer preferably includes fatty acid as a lubricant. Fatty acid gradually migrates into the surface of the magnetic layer and provides a constant coefficient of dynamic friction. Preferable fatty acid is saturated or unsaturated monobasic fatty acid having 12 to 24 carbon atoms, such as lauric acid, myristic acid, palmitic acid, stearic acid, behenic acid, oleic acid, linoleic acid, linolenic acid, or elaidic acid. Lauric acid, myristic acid, palmitic acid, stearic acid, behenic acid, and oleic acid are particularly preferable. An amount of fatty acid added to an underlying coating layer is selected from a range of 0.3 to 3% by mass with respect to the non-magnetic particles.

Other additives exhibiting lubricating effects, antistatic effects, dispersing effects, and plasticizing effects are used for the magnetic or non-magnetic layer in the present invention. Molybdenum disulfide; tungsten disulfide; graphite, boron nitride; graphite fluoride; silicone oil; silicone having a polar group; fatty acid-denatured silicone; fluorine-containing silicone; fluorine-containing alcohol; fluorine-containing ester; polyolefin; polyglycol; alkyl phosphate and alkali metallic salt thereof; alkyl sulfate and alkali metallic salt thereof; polyphenylether; fluorine-containing alkyl sulfate and alkali metallic salt thereof; monobasic fatty acid having 10 to 24 carbon atoms, which may include an unsaturated bond or may be branched, and metallic salts thereof (such as Li, Na, K, and Cu), or monovalent, bivalent, trivalent, quadrivalent, quinquevalent, and hexavalent alcohols having 12 to 22 carbon atoms, which may include an unsaturated bond or may be branched; alkoxy alcohol having 12 to 22 carbon atoms which may include an unsaturated bond or may be branched; mono-fatty acid ester, di-fatty acid ester, or tri-fatty acid ester formed by one of monobasic fatty acid having 10 to 24 carbon atoms, which may include an unsaturated bond or may be branched; and monovalent, bivalent, trivalent, quadrivalent, quinquevalent, and hexavalent alcohols having 2 to 12 carbon atoms, which may include an unsaturated bond or may be branched; fatty acid ester of monoalkylether of an alkylene oxide polymer; fatty acid amide having 2 to 22 carbon atoms; and aliphatic amine having 8 to 22 carbon atoms can be used. Specific examples thereof include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Further, nonionic surfactants, such as alkylene oxide-based, glycerine-based, and glycidol-based surfactants and an addition product of alkylphenol ethylene oxide; cationic surfactants, such as cyclic amine, ester amide, quaternary ammonium salts, hydantoin derivatives, heterocyclic rings, phosphoniums, or sulfoniums; anionic surfactants containing carboxylic acid, sulfonic acid, phosphoric acid, or an acidic group, such as a sulphate group or a phosphate group; and amphoteric surfactants, such as amino acids, aminosulfonic acids, sulfic acids or phosphates of amino alcohol, or alkyl betaine type surfactants can also be used. These surfactants are described in detail in *Kaimen Kasseizai Binran* ("*Surfactant Handbook*") published by Sangyo Tosho Publishing Company. These lubricants and surfactants need not be pure and may include impurities such as isomers, unreactant products, side reaction products, resolvents, oxides, and the like besides the main components. An amount of the impurities is preferably 30% by weight or less, and more preferably 10% by weight or less.

Types and amounts of the lubricants and surfactants used for the non-magnetic layer and the magnetic layer in the present invention can be selected as necessary. For example, fatty acids having different boiling points may be used for the non-magnetic layer and the magnetic layer so that exudation of the fatty acids on the surface is controlled, the amount of the surfactant may be adjusted to improve coating stability, or the amount of the lubricant added to the non-magnetic layer may be increased to improve lubricating effect. However, selection of the type or the amount of the lubricants and the surfactants is not limited to the above-described cases. All or a portion of the additives used in the present invention may be added to a coating solution for the magnetic layer or the underlying layer at any step of the manufacturing process thereof.

Specific examples of the lubricants used in the present invention include (all trade names): NAA-102, castor oil hardened fatty acid, NAA-42, CATION SA, NIMINE L-201, NONION E-208, ANON BF, ANON LG, butyl stearate, butyl laurate, and erucic acid, all of which are produced by NOF Corp.; oleic acid produced by Kanto Kagaku; FAL-205 and FAL-123 produced by Takemoto Oil & Fat Co., Ltd.; NGELB OL produced by New Japan Chemical Co., Ltd.; TA-3 produced by Shin-Etsu Chemical Co., Ltd.; ARMIDE P produced by Lion-Armer Co., Ltd.; DUOMINE TDO produced by Lion Corp.; BA-41G produced by The Nisshin Oil Mills, Ltd.; PROFUAN 2012 E, NEW POLE PE61, and IONET MS-400 produced by Sanyo Chemical Industries, Ltd.

A coating solution (dispersion) prepared using the above materials is coated onto the non-magnetic support to form the underlying coating layer or the magnetic layer. The magnetic recording medium of the present invention is manufactured by, for example, coating the coating solution for the magnetic layer onto the surface of the non-magnetic support, which is being conveyed, so that the magnetic layer after being dried has a thickness of preferably 5 nm to 5 μm, and more preferably 5 nm to 0.2 μm. Multiple coating solutions for magnetic layers may be successively or simultaneously coated one over another, and the coating solution for the underlying layer and the coating solution for the magnetic layer may be successively or simultaneously coated. Examples of a coating machine for coating the coating solution for the magnetic layer or the underlying layer include machines for air doctor coating, blade coating, rod coating, extrusion coating, air knife coating, squeeze coating, impregnation coating, reverse-roll coating, transfer roller coating, gravure coating, kiss-roll coating, cast coating, spray coating, spin coating, and the like. As for the above coating techniques, refer to, for example, *Saishin Kochingu Gijutsu* ("*New Coating Techniques*") published by Sogo Gijutsu Senta Co., Ltd. on May 31, 1983.

When the dispersion of ferromagnetic nanoparticles according to the present invention is applied to a magnetic recording medium having two or more layers, the following coating machines and coating methods are recommended as examples.

(1) First, a lower layer is formed by coating the dispersion using a coating machine that is generally used for coating a dispersion for a magnetic layer, such as a gravure coater, a roll coater, a blade coater, or an extrusion coater. Before the lower layer dries, the dispersion is coated thereon to form an upper layer using a support-pressing extrusion coater as disclosed in Japanese Patent Application Publication (JP-B) No. 1-46186 and JP-A Nos. 60-238179 and 2-265672.

(2) An upper layer and a lower layer are formed almost at the same time using a coating head having two slits for passing coating solutions therethrough as disclosed in JP-A Nos. 63-88080, 2-17971, and 2-265672.

(3) An upper layer and a lower layer are formed almost at the same time using an extrusion coater having a backup roll as disclosed in JP-A No. 2-174965.

A back coating layer (backing layer) may be formed on the surface of the base used in the present invention on which the magnetic layer is not formed. The back coating layer is formed on the surface of the base on which no magnetic layer is formed, by applying a coating solution for a back coating layer in which granular components, such as an abrasive and an antistatic agent, and a binder are dispersed in an organic solvent. Various inorganic pigments and carbon black can be used as the granular components. Further, resins, such as nitrocellulose, phenoxy resin, vinyl chloride-based resin, and polyurethane, can be used as the binder independently or in the form of a mixture. An adhesive layer may be formed on the surface of the base on which the dispersion of ferromagnetic nanoparticles and the coating solution for a back coating layer have been applied.

The magnetic layer is dried after the ferromagnetic nanoparticles included in the dispersion of ferromagnetic nanoparticles have been subjected to a magnetic field orientation process. Subsequently, the coated layer is subjected to a surface smoothing process. A supercalender roll, for example, is used in the surface smoothing process. The surface smoothing process eliminates holes formed by the solvent being removed by drying the magnetic layer, thereby improving the fill factor of the ferromagnetic particles in the magnetic layer. Therefore, a magnetic recording medium having high magnetic parametric performance can be obtained. A heat-resistant roll formed of plastic such as epoxy, polyimide, polyamide, polyamideimide, or the like is used as the calender roll. Alternatively, a metallic roll can be used.

The magnetic recording medium of the present invention has a very smooth surface whose center line average height is 0.1 to 5 nm, and preferably 1 to 4 nm at a cut off value of 0.25 mm, and is thus preferable for high-density recording. The very smooth surface is obtained by, as described above, calendering the magnetic layer formed by the particular ferromagnetic particles and binder. Preferable calendering conditions are a calender roll temperature of 60 to 100° C., preferably 70 to 100° C., and particularly preferably 80 to 100° C. and a calender roll pressure of 100 to 500 kg/cm, preferably 200 to 450 kg/cm, and particularly preferably 300 to 400 kg/cm. The magnetic recording medium thus obtained can be cut into desired size by a cutter and used.

The higher the recording density becomes, the more important it is to control the running position of a recording head against a track. Thus, it is preferable to control the running position of the recording head by magnetically recording, on the magnetic recording medium of the present invention, signals showing tracking position. Specifically, this can be accomplished by writing the magnetic recording medium with a commonly used magnetic head, however, this method has a drawback in that recording time become longer as recording density increases. A method has therefore been proposed in which the magnetic recording medium is written one time by magnetic transfer, and it is particularly preferable to apply this magnetic transfer method to high-density magnetic recording media such as the magnetic recording medium of the present invention.

Method of magnetic transfer include contacting magnetic transfer and non-contacting magnetic transfer using laser heating. Examples of contacting magnetic transfer are specifically disclosed in Japanese Patent Application Laid-Open (JP-A) Nos. 2000-331341, 2000-14667, 2001-143257, 2001-143258, 2001-243624, 2001-307324, 2001-312821, and 2001-325724, and it is preferable to apply contacting magnetic transfer to the magnetic recording medium of the present invention. Examples of non-contacting magnetic transfer are specifically disclosed in JP-A Nos. 2001-312808, 2001-331902, 2001-338419, 2002-50036, 2002-74605, and 2002-197647, and it is particularly preferable to apply non-contacting magnetic transfer to the magnetic recording medium of the present invention since it is non-contacting and thus does not contaminate or produce scratches in the medium.

EXAMPLES

Examples 1-2 and Comparative Example 1

1. Production of Ferromagnetic Nanoparticles (1) Preparation of Dispersion 1 of Ferromagnetic Nanoparticles (CoPt)

The following process was carried out in an $N_2$ atmosphere.

$H_2PtCl_6.6H_2O$ was dissolved in a solution (distilled water: ethanol=1:1) to obtain 100 ml of a solution having a concentration of 2 µmol/ml. 0.75 g of PVP having a weight average molecular weight of 40,000 was dissolved in the solution, and the resulting mixture was maintained under reflux at 100° C. Thereafter, 10 ml of a 12 µmol/ml aqueous solution of $CoCl_2.6H_2O$ was added to the mixture. A product obtained by dissolving 1 g of $NaBH_4$ in 15 ml of distilled water was added to the mixture. The resulting mixture was pressurized under an $N_2$ atmosphere and subjected to ultrafiltration using a membrane filter. The mixture was filtered until a volume thereof became ⅓ of its original volume. Subsequently, deaerated distilled water was added to the mixture so that the volume thereof reached its original volume, and the mixture was filtered until the volume thereof became ⅓ of its original volume. Again, deaerated distilled water was added to the mixture so that the volume thereof reached its original volume, and the mixture was filtered until the volume thereof became ⅓ of its original volume. As a result, a dispersion 1 of ferromagnetic nanoparticles of Example 1 was obtained.

(2) Preparation of Dispersion 2 of Ferromagnetic Nanoparticles (FePt)

The following process was carried out in an $N_2$ atmosphere.

$H_2PtCl_6.6H_2O$ was dissolved in a solution (distilled water: ethanol=1:1) to obtain 100 ml of a solution having a concentration of 2 µmol/ml. 0.3 g of PVP having a weight average molecular weight of 40,000 was dissolved in the solution, and the resulting mixture was maintained under reflux at 100° C. Thereafter, 10 ml of a 12 µmol/ml aqueous solution of $FeSO_4.7H_2O$ was added to the mixture. A product obtained by dissolving 1 g of $NaBH_4$ in 15 ml of distilled water was added to the mixture. The resulting mixture was pressurized under an $N_2$ atmosphere and subjected to ultrafiltration using a membrane filter. The mixture was filtered until a volume thereof became ⅓ of its original volume. Subsequently, deaerated distilled water was added to the mixture so that the volume thereof reached its original volume, and the mixture was filtered until the volume thereof became ⅓ of its original volume. Again, deaerated distilled water was added to the mixture so that the volume thereof reached its original volume, and the mixture was filtered until the volume thereof became ⅓ of its original volume. As a result, a dispersion 1 of ferromagnetic nanoparticles of Example 2 was obtained.

(3) Preparation of Dispersion 3 of Ferromagnetic Nanoparticles (FePt)

The following process was carried out in a high purity Ar gas.

0.5 mmol of platinum (II) acetylacetonate [$CH_3COCH=C(O—)CH_3]_2Pt$, 1.5 mmol of 1,2-hexadecanediol, and 20 ml of dioctylether were mixed and heated at 100° C. Next, 0.5 mmol of oleic acid, 0.5 mmol of oleilamine, and 1 mmol of $Fe(CO)_5$ were added to the resulting mixture, and the mixture was maintained under reflux at 297° C. for 30 minutes. 40 ml of ethanol was added to the mixture after cooling thereof such that a deposit was precipitated, and a supernatant liquid was removed. After 0.16 mmol of oleic acid and 0.15 mmol of oleilamine were added to the mixture, 25 ml of hexane was added to the mixture and dispersed therein. 20 ml of ethanol was added such that a deposit was precipitated, and a supernatant liquid was removed. After 0.16 mmol of oleic acid and 0.15 mmol of oleilamine were added to the mixture, 20 ml of hexane was added to the mixture and dispersed therein. 15 ml of ethanol was added such that a deposit was precipitated, and a supernatant liquid was removed. 0.16 mmol of oleic acid and 0.15 mmol of oleilamine were added to the mixture, and 20 ml of hexane was added to the mixture and dispersed therein, whereby a dispersion 3 of ferromagnetic nanoparticles of Comparative Example 1 was obtained.

2. Confirmation of Nanoparticles

A sample for a transmission electron microscope (TEM) was produced by placing each of the prepared dispersions of ferromagnetic nanoparticles on a mesh for observation with a TEM and drying each dispersion. A particle size was measured for each dispersion using a TEM (manufactured by Hitachi, Ltd.) having an acceleration voltage of 300 KV. As a result, nanoparticles having a diameter of 5 nm were confirmed.

3. Elemental Analysis

A Co/Fe ratio and a Pt/Fe ratio were determined using an ICP.

4. Preparation of Nanoparticle-containing Coating Solution a) Coating by Spin Coater The dispersion of each of Examples 1-2 and Comparative Example 1 including ferromagnetic nanoparticles at a concentration of 5 mg/ml was dropped, in an amount of 0.04 ml/cm$^2$, onto an ARAMICA base (manufactured by Asahi Kasei Corp.) having a thickness of 40 μm, and the base was spun at 2000 rpm for 30 seconds and dried. Whether the coating layer formed on the base was uniform or not was visually observed. Thereafter, the base with the coating layer formed thereon was heated in an $N_2$ atmosphere with an Ar laser having the following characteristics.

(Ar Laser)
Wavelength: 488 nm
Laser beam diameter: 25 μm
Linear velocity: 2 m/sec
Recording power: 20 W 5. Annealing A freeze-dried product of the dispersion of each of Examples 1-2 and Comparative Example 1 was heated in an electric furnace from room temperature to 600° C. at a programming rate of 50° C./min using a differential thermal analyzer (trade name: TGD7000, manufactured by ULVAC-RIKO, Inc.). X-ray diffraction and magnetic property of the heated samples were evaluated.

6. X-ray Diffraction

Samples for X-ray diffraction were produced by placing each of the prepared solutions on a crystal, reflection-free sample holder and drying each solution. A Cu Kα ray was generated by an X-ray diffractometer (manufactured by Rigaku Corp.) under conditions of a tube voltage of 50 KV and a tube current of 300 mA, and X-ray diffraction was carried out by a powder method using a goniometer. An irregular phase and a regular phase were distinguished based on the crystal structure.

7. Magnetic Property

Magnetic property was measured at an applied magnetic field of 796 kA/m (10 kOe) using a sensitive magnetiziation vector measuring apparatus and a DATA processor (both manufactured by Toei Industry Co., Ltd.).

The results of the above evaluations are given in Table 1.

TABLE 1

| | | Pt/Co | Pt/Fe | Coatability | Structure | Hc (kA/m) |
|---|---|---|---|---|---|---|
| Example 1 | Dispersion 1 | NA | 0.98 | Uniform layer | Regular phase | 222.88 |
| Example 2 | Dispersion 2 | 2.8 | NA | Uniform layer | Regular phase | 91.54 |
| Comparative Example 1 | Dispersion 3 | NA | 0.97 | Ununiform layer | Regular phase | 226.86 |

It can be seen from Table 1 that the materials coated with diepersions of ferromagnetic nanoparticles having excellent industrial coatability were obtained in Examples 1 and 2.

According to the present invention, ferromagnetic nanoparticles having a holding power Hc of 95.5 kA/m or more, a material coated with a dispersion of ferromagnetic nanoparticles having excellent industrial coatability, and a magnetic recording medium using the material can be provided.

What is claimed is:

1. A method for producing ferromagnetic nanoparticles comprising:
    reducing, in the presence of a polymer, at least two metals having different reduction potentials at least twice, using at least two reducing agents having different reduction potentials to obtain a resultant mixture, and
    heating the resultant,
    wherein at least two of the metals are a noble metal and a poor metal, the noble metal is reduced before the poor metal, the ferromagnetic nanoparticles are ferromagnetic regular alloys having a CuAu or $Cu_3Au$ crystal structure, and a particle size of the ferromagnetic nanoparticles is 3 to 20 nm.

2. The method according to claim 1, wherein the heating is conducted by using a laser.

3. The method according to claim 2, wherein the method further comprises oxidizing the resultant before the heating, and wherein the heating is conducted under a non-oxidative atmosphere.

4. The-method according to claim 3, wherein the noble metal is reduced with a reducing agent having a reduction potential higher than −0.2 V and the poor metal is reduced with a reducing agent having a reduction potential lower than −0.2 V.

5. The method according to claim 3, wherein the noble metal is platinum and the poor metal is iron.

6. The method according to claim 2, wherein the noble metal is reduced with a reducing agent having a reduction potential higher than −0.2 V and the poor metal is reduced with a reducing agent having a reduction potential lower than −0.2 V.

7. The method according to claim 2, wherein the noble metal is platinum and the poor metal is iron.

8. The method according to claim 2, wherein the heating is conducted under an $N_2$ atmosphere and the laser is an Ar laser.

9. The method according to claim 1, wherein the method further comprises oxidizing the resultant before the heating, and wherein the heating is conducted under a non-oxidative atmosphere.

10. The method according to claim 9, wherein the noble metal is reduced with a reducing agent having a reduction potential higher than −0.2 V and the poor metal is reduced with a reducing agent having a reduction potential lower than −0.2 V.

11. The method according to claim 9, wherein the noble metal is platinum and the poor metal is iron.

12. The method according to claim 1, wherein the noble metal is reduced with a reducing agent having a reduction potential higher than −0.2 V and the poor metal is reduced with a reducing agent having a reduction potential lower than −0.2 V.

13. The method according to claim 1, wherein at least one of the metals is selected from the group consisting of Co, Fe, Ni, Mn, Cr, Pr, Pt, Au, Ag, Ir, and Rh.

14. The method according to claim 1, wherein the noble metal is platinum and the poor metal is iron.

15. The method according to claim 1, wherein the particle size of the ferromagnetic nanoparticles is 3 to 10 nm.

* * * * *